Aug. 1, 1967 R. L. NOACK 3,333,333

METHOD OF MAKING MAGNETIC MATERIAL WITH PATTERN OF EMBEDDED NON-MAGNETIC MATERIAL

Filed Aug. 14, 1963

INVENTOR.
ROBERT L. NOACK
BY
Carl V. Olson
Attorney

United States Patent Office 3,333,333

Patented Aug. 1, 1967

3,333,333

METHOD OF MAKING MAGNETIC MATERIAL WITH PATTERN OF EMBEDDED NON-MAGNETIC MATERIAL

Robert L. Noack, Neshanic, N.J., assignor to Radio Corporation of America, a corporation of Delaware Filed Aug. 14, 1963, Ser. No. 302,186

5 Claims. (Cl. 29—604)

Figures 1, 2, 3, 4, 5:
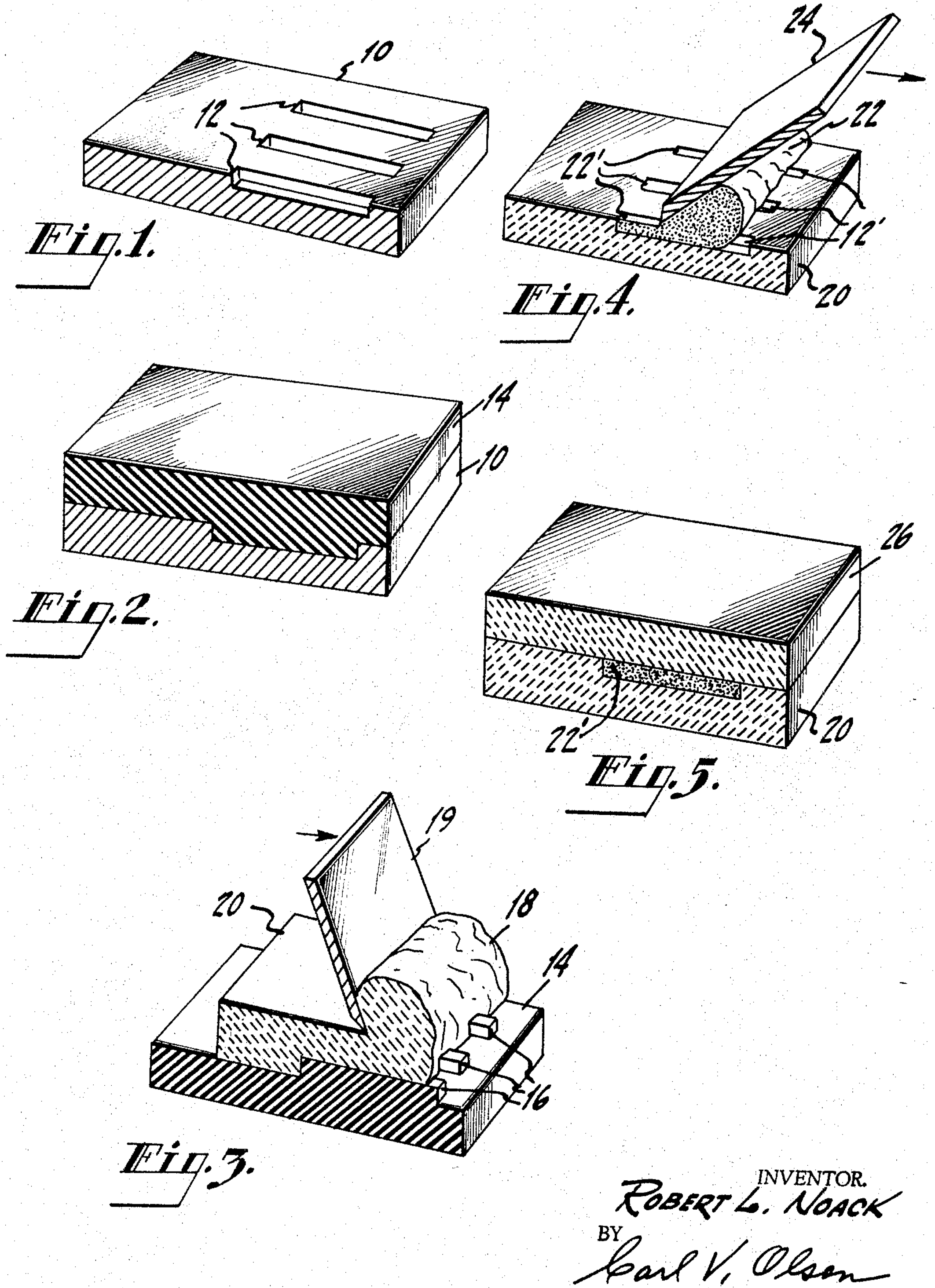

This invention relates to methods of making articles of magnetic material with an embedded pattern of non-magnetic material which is conductive or non-conductive, and particularly to methods of making such articles in which the magnetic material is sintered magnetic ferrite. While not limited thereto, the invention is particularly useful in the construction of magnetic memories and electromagnetic logic devices for use in electronic data processing equipment.

Magnetic memory element arrays presently enjoying widespread commercial use are in the form of rows and columns of ferrite magnetic cores which have been manually threaded with row and column conductors. There is a demand for magnetic memory arrays which are faster in operation by virtue of having smaller magnetic memory elements than can be wired by hand. A magnetic memory array capable of automated fabrication is also less expensive to construct in commercial quantities.

It has been proposed to construct an array of magnetic memory elements by forming thin sheets of "green" (i.e. unfired) ferrite, printing conductive patterns on the sheets, laminating a plurality of such sheets with the conductive patterns in a desired registry and firing the lamination to provide a unitary homogeneous sintered ferrite sheet having a desired two-state magnetic characteristic. The embedded conductors cooperate with surrounding ferrite to constitute memory elements that are addressable for the writing in and reading out of digital information.

It is a general object of this invention to provide an improved method of making a sintered sheet of uniform, homogeneous void-free magnetic material (such as ferrite) having an accurately dimensioned and spaced pattern of non-magnetic material embedded therein. The non-magnetic material may be electrically conductive or non-conductive.

It is another object of this invention to provide an improved method of making a sheet of magnetic ferrite having embedded non-magnetic material in any desired pattern including reentrant patterns which preclude the use of a stencil.

It is a further object to provide an improved method of making a sheet of magnetic material with embedded non-magnetic material in a planar pattern having relatively square edges when viewed in cross section.

According to one specific example of the invention, a sheet of uniform homogeneous sintered ferrite having embedded conductors is constructed by the steps of: etching a depression pattern in a copper sheet, in accordance with a desired pattern of conductors, by the photoresist process; casting a rubber plate on said etched copper sheet and then removing the cast rubber plate from the copper sheet; doctor blading a ferrite slurry over the rubber plate, solidifying the doctor bladed slurry by drying, and removing the doctor bladed ferrite sheet from the rubber plate; applying a paste of conductive powder and organic vehicle into the depressions in said doctor bladed ferrite sheet with a spatula, said conductive powder being selected from the class including palladium, platinum, rhodium, and rhenium, said vehicle being a grease such as automotive grease or "Apiezon-M" vacuum grease; pressure laminating another ferrite sheet over the surface of said ferrite sheet having the paste conductors, and firing the lamination to sinter the ferrite.

These and other objects and aspects of the invention will be apparent to those skilled in the art from the following more detailed description taken in conjunction with the appended drawing, wherein:

FIGS. 1 through 5 illustrate successive steps of a method which follows the teachings of this invention.

Referring now in greater detail to the drawing, FIG. 1 shows a sheet of conductive metal 10, such as copper, which has been etched to provide a depression pattern 12 in accordance with a desired pattern of conductors to be embedded in a magnetic ferrite sheet. The depression pattern 12 may be formed by the well-known photoresist process. This process involves the application of an unexposed photoresist material (one suitable type is known in the trade as "KPR" and sold by Eastman Kodak Company) on the sheet 10, optically exposing the portions of the photoresist that are intended to remain on the sheet 10, chemically developing the exposed photoresist, and dissolving away the unexposed photoresist to leave the desired pattern as exposed metal on the sheet 10. The exposed metal is then etched to provide the depression pattern 12. If the conductive sheet 10 is copper, the etchant may be ammonium persulfate, chromic acid or copper chloride. Thereafter, the photoresist plastic is removed from the surface of the sheet 10 by a suitable solvent such as "KPR stripper."

The photoresist process, being an optical and chemical process, permits the establishment of a desired depression pattern having extremely small and accurate dimensions. The exposed portions of the metal sheet 10 where conductors are desired may be from one to three milli-inches in transverse dimensions (height and width) and may be spaced apart from each other uniformly by amounts in the range of from about five to ten milli-inches. Any other pattern may be employed.

A rubber plate 14 is then cast or molded on the copper sheet 10. This is done by pouring uncured liquid rubber onto the sheet 10. The liquid rubber has a "watery" consistency so that it fills the depression pattern 12 without any air bubbles or voids. Thereafter the liquid rubber cures or solidifies due to the action of a catalyst and a hardener in the liquid rubber. Rubbers which are suitable are silicone rubber potting compounds such as Types RTV–60, RTV–11 and LS–53 "Silastic" rubber compounds sold by Dow Corning Corporation, Midland, Mich.

The cured rubber plate 14 is then removed from the copper metal sheet 10 and positioned as shown in FIG. 3 with its raised pattern 16 (corresponding to the depression pattern 12 in the metal sheet) uppermost. The cured rubber is flexible and tough so that the rubber plate 14 can be removed from the metal sheet 10 without disturbing or damaging the raised pattern.

Alternatively, the plate 14 having the desired raised pattern may be constructed of glass rather than rubber. Glass is a desirable material because it is completely unaffected by all materials and solvents which may be involved in subsequent steps of the method. However, the construction of a smooth glass plate with a raised pattern is more difficult than the described construction of a rubber plate. The plate 14, whether of rubber or glass, may be used as a mold for making a large number of identical doctor bladed ferrite sheets according to the following method steps.

FIG. 3 illustrates the doctor blading of a viscose liquid-like magnetic material, which in the present example is a green ferrite slurry 18, over the rubber plate 14. The ferrite slurry 18 is spread to a uniform thickness by a doctor blade 19 over the raised pattern 16 on the rubber plate 14. By way of example, the ferrite slurry may be made in the proportions of 65 grams of a calcinated ferrite made of zinc, magnesium and manganese oxides, 13 grams of an organic binder and 52 grams of a solvent such as methyl ethyl ketone or toluene. The binder may be one sold under the trade name "VYNS" by the Union Carbide Corporation. Another binder which is suitable when used in a smaller proportion is polyvinyl butylal sold under the trade name "Butvar" by Shawinigan Resins, Springfield, Mass. The materials are milled in a ball mill or a grinding mill and additional solvent is added to achieve a viscosity of about 900 centipoises, which is suitable for doctor bladed purposes. The thickness of the resulting individual doctor bladed green ferrite sheet 20 may be, for example, in the range of from about one milli-inch to about twenty milli-inches. The green ferrite slurry 18 flows freely into the corners around the raised pattern 16 and so that there are no voids in the resulting doctor bladed sheet. After drying for about five minutes, the ferrite slurry solidifies and becomes a thin flexible leather-like sheet of solidified green ferrite having a depression pattern where conductive material is desired.

Alternatively, the "doctor bladed" green ferrite sheet 20 may be created over the raised pattern 16 by means of a calendering roll, or by means of a spray gun.

The dried, leather-like green ferrite sheet 20 is removed from the rubber plate 14 and turned over to the position shown in FIG. 4. FIG. 4 illustrates the applying of a paste 22 of a conductive powder and a vehicle into the depression pattern 12' in the green ferrite sheet 20 by means of a spatula 24. The conductive powder should have a particle size much less than the minimum dimension of the pattern 12'. The spatula 24 may, for example, be a razor blade, or any other suitable blade having a smooth straight edge suitable for being drawn across the top surface of the ferrite sheet 20. The spatula 24 is initially applied to the ferrite sheet 20 near an edge 12 with a charge of the paste 22, and the spatula is drawn across the sheet so that the conductive paste is forced into the depression pattern 12' in the ferrite sheet. The spatula 24 carries all excess paste 22 off beyond the edge of the sheet 20 leaving the pattern 12' filled flush with the top of the sheet. All other paste 22 is scraped from the top of the sheet.

The conductive paste 13 includes a conductive refractory metal powder in an organic vehicle having a desired amount of rigidity or body. Suitable vehicles are ordinary automotive grease, "Apiezon" vacuum grease "M" sold by Shell Chemicals, Ltd., and "Cello-Seal" vacuum grease sold by Fisher Chemicals Company. The grease may constitute from 5 to 30 percent by weight of the paste. The conductive powder in the paste 22 is preferably selected from the class of refractory metals including palladium, platinum, rhodium and rhenium, or alloys or mixtures of the refractory metals with gold or silver. The refractory metals have a sufficiently high melting point to withstand a final step in the process at which time the ferrite is fired.

The resulting green ferrite sheet 20 with a flush embedded conductive paste pattern 22' is laminated with another green ferrite sheet 26 so that the conductive paste pattern is embedded between the two sheets, as shown in FIG. 5. Lamination is accomplished with a pressure of about 900 pounds per square inch for about 10 minutes at a temperature of about 90° C. if the binder is "Butvar" and 105° C. if the binder is "VYNS." This laminating temperature is not high high enough to cause a sintering of the ferrite, but is sufficiently high to facilitate a physical bonding of the separate sheets.

The pressure laminated green ferrite sheet is subjected to a temperature in the range of from 200 to 400° C. to burn out the binders, and then to a temperature which is sufficiently high to sinter the green ferrite and cause it to assume the desired magnetic properties. The sintering temperature of most suitable ferrites is known and may be about 1200° C. After sintering, the sheet may be air quenched at room temperature and/or may be subsequently annealed in nitrogen at a temperature of 1100° C. for one hour. The foregoing is merely illustrative; the particular ferrite composition employed should be given the known heat treatment appropriate for producing the desired electro-magnetic characteristics.

The heat treatment results in a shrinking of the ferrite by an amount such as from 5 to 30%. The heat treatment, in driving off the remaining vehicle (grease) of the paste conductors, also results in a shrinkage of the paste conductors. The proportion of vehicle in the paste conductors is selected so that the shrinkage of the paste conductors is substantially equal to, and preferably is a little less than, the shrinkage of the surrounding ferrite. This results in a compacting of the conductive particles by the ferrite so that the particles are forced into intimate contact to form a good electrical conductor. Another result is the avoidance of any air spaces which would, if present, interfere with the uniformity of the electro-magnetic characteristics of the resulting memory elements.

The final product consists of a sintered magnetic ferrite sheet having embedded conductors 22'. The ferrite sheet is uniform, homogeneous and free from any voids or cracks near the conductors 22'. The conductors have the desired high dimensional and locational accuracy. While a sandwich of only two laminated ferrite sheets 20 and 26 are shown in FIG. 5, the sandwich may include any desired number of ferrite sheets with patterns of conductive material at the interfaces of the sheets.

In practicing the method, the best results are achieved with certain combinations of ingredients. Care must be taken so that the shrinkage, upon firing of the green ferrite substantially equals the shrinkage of the conductive paste. When the ferrite slurry is made using the "VYNS" binder, all of the mentioned greases are suitable for making the conductive paste. When "Butvar" is used as the binder in the ferrite slurry, the resulting green ferrite sheets are more porous. Because the green ferrite sheet is more porous, the use of automotive grease for the conductive paste has the disadvantage that some of the grease tends to flow into the pores of the ferrite and upset the shrinkage calculations. This difficulty is avoided by using the "Apiezon-M" or the "Cello-Seal" vacuum grease with "Butvar" ferrite. Account should also be taken of the fact that a ferrite sheet including "VYNS" binder shrinks about 25 percent when fired compared with 17 percent for a ferrite sheet including "Butvar" as a binder.

The silicone rubber employed for the plate 14 should be one not affected by the solvent employed in the ferrite slurry. For this reason, if the solvent is methyl ethyl ketone, the Type RTV–60 and Type RTV–11 rubbers are preferred; and if the solvent is toluene, the Type LS–53 rubber is preferred. A specific example of compatible materials providing uniform shrinkage is as follows:

A ferrite slurry was made using 92 grams of zinc, magnesium and manganese oxides having particle sizes of one-half micron and less, 5.5 grams of "Butvar" binder, 2.5 grams of "Flexol" brand bi-two-ethylhexyl phithilate plasticizer sold by Union Carbide Chemicals Company, 0.5 gram of "Tergitol" non-ionic TMN brand of trimethyl nonyl ether of polyethylene glycol sold by Union Carbide Chemicals Company, and 100 cc. of methyl ethyl ketone solvent. The above-described ferrite slurry was doctor bladed on a Type RTV–60 silicone rubber plate having a desired raised pattern. A conductive paste was made using rhodium powder having particle sizes in the range of from one to five microns. The powder was thoroughly mixed with 10 percent by weight of "Apiezon" vacuum grease. The conductive paste was applied to the depression pattern in the green ferrite sheet and another green ferrite sheet was laminated over the conductive paste pattern. The ferrite lamination was fired at 2300° F. for two hours. The firing caused a uniform shrinkage of both the ferrite and the conductive paste in the amount of about 17 percent. The resulting structure was free of cracks and voids and included a dense compacted conductive powder pattern having a low electrical resistance.

What has been said regarding the method of constructing a sheet of magnetic material having a pattern of embedded conductive material applies also where an embedded pattern of nonconductive and non-magnetic material is desired. In this case the paste 22 is made using the grease vehicle and particles of the desired material. Magnesium oxide and tin oxide, in powder form, are suitable non-magnetic ceramic materials for use in making the paste. The proportions may be 65 to 75 percent non-magnetic ceramic powder and 35 to 25 percent grease vehicle. When the ferrite with an embedded non-magnetic ceramic paste pattern is fired, the ferrite sinters and shrinks and the ceramic paste pattern shrinks because the grease is driven off. The magnesium oxide and tin oxide ceramic powders do not sinter at the sintering temperature of the ferrite. Therefore, diffusion of the non-magnetic ceramic into the ferrite is avoided.

The final product may be multi-layered and include patterns of conductive material at some interfaces of ferrite layers and non-magnetic ceramic at other interfaces. The conductive patterns may be used for carrying electric currents in the performance of write and read operations in a magnetic memory array, and the non-magnetic ceramic pattern may serve to restrict flux paths between individual magnetic memory elements constituted by the ferrite magnetic material surrounding portion of the conductive patterns. Conductive patterns may also be used for electrostatic shielding and for restricting flux paths.

The patterns of embedded conductive material and/or embedded non-magnetic ceramic material may have configurations, such as reentrant shapes, which preclude the use of stencils for creating the patterns. The designer of the finished product is thus free to specify patterns providing the best electro-magnetic operating characteristics for the intended purpose.

What is claimed is:

1. The method of forming a sheet of uniform homogeneous sintered magnetic ferrite having an embedded pattern of non-magnetic material, comprising the steps of doctor blading a ferrite slurry over a plate having a raised pattern corresponding to the desired embedded pattern, solidifying the doctor bladed slurry by drying, and removing the green doctor bladed ferrite sheet from the plate to expose the resulting depression pattern, applying a paste of non-magnetic conductive powder and organic vehicle into the depression pattern in said doctor bladed ferrite sheet, said non-magnetic conductive powder being selected from the class of refractory metals including palladium, platinum, rhodium and rhenium, said vehicle being a grease, pressure laminating another green ferrite sheet over the surface of said green ferrite sheet having an embedded paste pattern, and firing the lamination to sinter the ferrite, said non-magnetic paste including a proportion of organic vehicle which when driven off by said firing results in a shrinkage of the volume of the non-magnetic paste by an amount slightly less than or equal to the shrinkage of the surrounding ferrite on firing.

2. The method of forming a sheet of uniform homogeneous sintered magnetic ferrite having an embedded pattern of non-magnetic material, comprising the steps of doctor blading a ferrite slurry over a plate having a raised pattern corresponding to the desired embedded pattern, solidifying the doctor bladed slurry by drying, and removing the green doctor bladed ferrite sheet from the plate to expose the resulting depression pattern, applying a paste of non-magnetic conductive powder and organic vehicle into the depression pattern in said doctor bladed ferrite sheet, said non-magnetic powder being a refractory metal such as palladium, platinum, rhodium or rhenium, or being a ceramic such as magnesium oxide or tin oxide, said vehicle being a grease, pressure laminating another green ferrite sheet over the surface of said green ferrite sheet having an embedded paste pattern, and firing the lamination to sinter the ferrite, said non-magnetic paste including a proportion of organic vehicle which when driven off by said firing results in a shrinkage of the volume of the non-magnetic paste by an amount slightly less than or equal to the shrinkage of the surrounding ferrite on firing.

3. The method of forming a sheet of uniform homogeneous sintered magnetic ferrite having embedded non-magnetic material, comprising the steps of etching a depression pattern in a metal sheet, in accordance with a desired pattern, by the photoresist process, casting a rubber plate on said etched metal sheet and then removing the cast rubber plate from the metal sheet, doctor blading a ferrite slurry over the rubber plate, solidifying the doctor bladed slurry by drying, and removing the doctor bladed ferrite sheet from the rubber plate, applying a paste of non-magnetic conductive powder and vehicle into the depressions in said doctor bladed ferrite sheet, said vehicle being a grease, pressure laminating another ferrite sheet over the surface of said ferrite sheet having embedded paste, and firing the lamination to sinter the ferrite.

4. The method of forming a sheet of uniform homogeneous sintered ferrite having embedded conductors, comprising the steps of etching a depression pattern in a copper sheet, in accordance with a desired pattern of conductors, by the photo-resist process, casting a rubber plate on said etched copper sheet and then removing the cast rubber plate from the copper sheet, doctor blading a ferrite slurry over the rubber plate, solidifying the doctor bladed slurry by drying, and removing the doctor bladed ferrite sheet from the rubber plate, applying a paste of non-magnetic conductive powder and vehicle into the depressions in said doctor bladed ferrite sheet, said conductive powder being selected from the class including palladium, platinum, rhodium and rhenium, said vehicle being a grease, pressure laminating another ferrite sheet over the surface of said ferrite sheet having paste conductors, and firing the lamination to sinter the ferrite.

5. The method of forming a sheet of uniform homogeneous sintered ferrite having embedded conductors, comprising the steps of etching a depression pattern in a copper sheet, in accordance with a desired pattern of conductors, by the photo-resist process, casting a rubber plate on said etched copper sheet and then removing the cast rubber plate from the copper sheet, doctor blading a ferrite slurry over the rubber plate, solidifying the doctor bladed slurry by drying, and removing the doctor bladed ferrite sheet from the rubber plate, applying a paste of conductive powder and organic vehicle into the depressions in said doctor bladed ferrite sheet with a spatula, said non-magnetic conductive powder being selected from the class including palladium, platinum, rhodium and rhenium, said vehicle being a grease, pressure laminating another ferrite sheet over the surface of said ferrite sheet having paste conductors, and firing the lamination to sinter the ferrite, said paste including a proportion of organic vehicle which when driven off by said firing results in a shrinkage of the volume of the non-magnetic paste by an amount slightly less than or equal to the shrinkage of the surrounding ferrite on firing.

References Cited

UNITED STATES PATENTS

| | | | |
|---|---|---|---|
| 421,561 | 2/1890 | Davis | 101—126 |
| 1,792,486 | 2/1931 | Feinberg | 264—225 |
| 2,444,860 | 2/1948 | Summer | 101—115 |
| 2,486,410 | 1/1949 | Howatt. | |
| 2,934,748 | 4/1960 | Steimen | 340—174 |
| 2,970,296 | 1/1961 | Horton | 340—174 |
| 2,985,948 | 5/1961 | Peters | 29—155.5 |
| 3,040,301 | 6/1962 | Howatt et al. | |
| 3,077,021 | 2/1963 | Brownlow | 156—89 X |
| 3,085,295 | 4/1963 | Pizzino et al. | |
| 3,192,086 | 6/1965 | Gyurk | 75—208 X |
| 3,247,573 | 4/1966 | Noack | 29—155.5 |

JOHN F. CAMPBELL, *Primary Examiner.*

JACOB H. STEINBERG, *Examiner.*

PAUL M. COHEN, *Assistant Examiner.*